(12) United States Patent
Shirai

(10) Patent No.: US 12,052,481 B2
(45) Date of Patent: Jul. 30, 2024

(54) IMAGING APPARATUS

(71) Applicant: Sony Semiconductor Solutions Corporation, Kanagawa (JP)

(72) Inventor: Hirotaka Shirai, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 168 days.

(21) Appl. No.: 17/772,489

(22) PCT Filed: Oct. 26, 2020

(86) PCT No.: PCT/JP2020/040114
§ 371 (c)(1),
(2) Date: Apr. 27, 2022

(87) PCT Pub. No.: WO2021/090722
PCT Pub. Date: May 14, 2021

(65) Prior Publication Data
US 2022/0345603 A1  Oct. 27, 2022

(30) Foreign Application Priority Data

Nov. 7, 2019  (JP) ................................ 2019-202492

(51) Int. Cl.
*H04N 23/45* (2023.01)
*H04N 23/51* (2023.01)

(52) U.S. Cl.
CPC ............. *H04N 23/45* (2023.01); *H04N 23/51* (2023.01)

(58) Field of Classification Search
CPC ...... G03B 17/561; G03B 17/12; G03B 37/04; B60R 11/04; B60R 11/045; B60R 2011/0026; G02B 13/02; G02B 13/04
See application file for complete search history.

(56) References Cited

U.S. PATENT DOCUMENTS 8,581,982 B1 * 11/2013 Haley ..................... H04N 7/18
  348/148
9,854,225 B2 * 12/2017 Kimura .................. B60R 11/04
(Continued)

FOREIGN PATENT DOCUMENTS

CN  106331446 A  1/2017
CN  109878428 A  6/2019
(Continued)

OTHER PUBLICATIONS

International Search Report and English translation thereof mailed Dec. 15, 2020 in connection with International Application No. PCT/JP2020/040114.
(Continued)

*Primary Examiner* — Pritham D Prabhakher
(74) *Attorney, Agent, or Firm* — Wolf, Greenfield & Sacks, P.C.

(57) ABSTRACT

[Object] To provide an imaging apparatus that can reduce the size of a configuration including two imaging modules. [Solving Means] An imaging apparatus includes first and second imaging modules and a frame portion. The first and second imaging modules that include first and second lens portions having mutually different focal distances and first and second imaging elements that light passing through the first and second lens portions enters, are configured to be capable of imaging first and second imaging regions each having a short side and a long side in an external environment spread in front in an imaging direction, respectively, and are arranged side by side in a direction along the short side. The frame portion includes first and second holding portions that hold the first and second imaging modules.

15 Claims, 11 Drawing Sheets

(56) References Cited

U.S. PATENT DOCUMENTS

| | | | |
|---|---|---|---|
| 10,131,292 B2* | 11/2018 | Oh | B60R 11/04 |
| 10,232,800 B1* | 3/2019 | Okuda | B60R 11/04 |
| 11,019,324 B2* | 5/2021 | Ishii | H04N 23/52 |
| 11,181,816 B2* | 11/2021 | Chikata | B60R 11/04 |
| 2014/0055617 A1 | 2/2014 | Minikey, Jr. | |
| 2016/0006911 A1* | 1/2016 | Kimura | H04N 23/54 |
| | | | 348/47 |
| 2016/0227079 A1* | 8/2016 | Oh | H04N 23/45 |
| 2017/0098131 A1* | 4/2017 | Shashua | G06V 20/58 |
| 2017/0371347 A1* | 12/2017 | Cohen | G06T 7/521 |
| 2018/0183982 A1* | 6/2018 | Lee | H04N 23/698 |
| 2019/0143906 A1* | 5/2019 | Furutake | B60R 11/04 |
| | | | 348/148 |
| 2019/0146322 A1 | 5/2019 | Chikata | |
| 2019/0168687 A1* | 6/2019 | Okuda | H04N 23/57 |
| 2019/0170545 A1 | 6/2019 | Higashimachi | |
| 2019/0248300 A1 | 8/2019 | Takagi | |
| 2019/0320159 A1 | 10/2019 | Ishii | |

FOREIGN PATENT DOCUMENTS

| | | |
|---|---|---|
| CN | 110166737 A | 8/2019 |
| JP | 2001-257923 A | 9/2001 |
| JP | 2014-216730 A | 11/2014 |
| JP | 6288034 B2 | 2/2018 |
| JP | 2018-109724 A | 7/2018 |
| JP | 2019-089528 A | 6/2019 |
| WO | WO 2014/035958 A1 | 3/2014 |

OTHER PUBLICATIONS

International Written Opinion and English translation thereof mailed Dec. 15, 2020 in connection with International Application No. PCT/JP2020/040114.

International Preliminary Report on Patentability and English translation thereof mailed May 19, 2022 in connection with International Application No. PCT/JP2020/040114.

Extended European Search Report issued Nov. 18, 2022 in connection with European Application No. 20885068.5.

* cited by examiner

IMAGING APPARATUS

CROSS-REFERENCE TO RELATED APPLICATIONS

This application claims the benefit under 35 U.S.C. § 371 as a U.S. National Stage Entry of International Application No. PCT/JP2020/040114, filed in the Japanese Patent Office as a Receiving Office on Oct. 26, 2020, which claims priority to Japanese Patent Application Number JP2019-202492, filed in the Japanese Patent Office on Nov. 7, 2019, each of which is hereby incorporated by reference in its entirety.

TECHNICAL FIELD

The present technology relates to an imaging apparatus including a plurality of imaging modules.

BACKGROUND ART

An imaging apparatus including a pair of imaging modules arranged side by side in a left-right direction is known (e.g., see Patent Literature 1). Such an imaging apparatus can be configured as, for example, a stereo camera capable of acquiring information in a depth direction, a multi-camera capable of simultaneously acquiring images of two mutually different imaging regions, or the like.

CITATION LIST

Patent Literature

Patent Literature 1: Japanese Patent Application Laid-open No. 2018-109724

DISCLOSURE OF INVENTION

Technical Problem

In the above-mentioned imaging apparatus, vignetting is more likely to occur when the distance between the two imaging modules is reduced. Moreover, the imaging apparatus requires hoods for preventing lens flare for each of the imaging modules. Due to these circumstances, it is difficult to reduce the size of such an imaging apparatus.

In view of the above-mentioned circumstances, it is an object of the present technology to provide an imaging apparatus that can reduce the size of a configuration including two imaging modules.

Solution to Problem

In order to accomplish the above-mentioned object, an imaging apparatus according to an embodiment of the present technology includes first and second imaging modules and a frame portion.

The first and second imaging modules include first and second lens portions having mutually different focal distances and first and second imaging elements that light passing through the first and second lens portions enters, are configured to be capable of imaging first and second imaging regions each having a short side and a long side in an external environment spread in front in an imaging direction, respectively, and are arranged side by side in a direction along the short side.

The frame portion include first and second holding portions that hold the first and second imaging modules.

With this imaging apparatus, since the two imaging modules are arranged side by side in the direction along the short side of the imaging region, vignetting is less likely to occur even when the distance between the two imaging modules is reduced. Therefore, with this imaging apparatus, the size can be reduced without deteriorating the performance.

In each of the first and second imaging regions, the short side may extend vertically and the long side may extend horizontally.

The second holding portion may be located vertically above the first holding portion.

The optical axes of the first and second imaging modules may overlap in the direction along the short side.

The second holding portion may be positioned more forward than the first holding portion.

The second holding portion may be positioned more forward than the first lens portion.

The frame portion may further include a connecting portion that connects the first and second holding portions to each other in a front-back direction.

With these configurations, the space in front of the first imaging module is shielded from the side of the second imaging module. Accordingly, external light deviating from an angle of view of the first imaging module toward the second module can be prevented from entering the first lens portion.

The first and second holding portions and the connecting portion may be integrally formed.

With this configuration, the first and second imaging modules are positioned by the single frame portion. Therefore, with this imaging apparatus, the position shift of the first and second imaging modules is less likely to occur.

The first lens portion may have a focal distance longer than a focal distance of the second lens portion.

With this configuration, since the focal distance of the first lens portion of the first imaging module positioned at the rear is set to be longer, vignetting is less likely to occur.

The imaging apparatus may further include a pair of hood portions that have a through-hole portion formed therein and cover a space in front of the first and second imaging modules on two sides in a direction along the long side. In this case, the pair of hood portions are favorably configured to prevent external light passing through the through-hole portion from entering the first and second imaging modules.

The pair of hood portions may have a tapered shape having a width in the direction along the long side that is increased forward. In this case, the through-hole portion may penetrate the hood portion in a front-back direction.

The through-hole portion may be formed in a slit shape extending in the direction along the short side.

With these configurations, since the hood portion is provided with the through-hole portion, air stagnation in the space in front of the first and second imaging modules, which causes fogging of the first and second lens portions, can be prevented. Moreover, with this configuration, external light due to the provision of the through-hole portion is less likely to affect the first and second imaging modules.

The imaging apparatus may further include a shade portion that covers a space in front of the first and second imaging modules from a side of the first imaging module in the direction along the short side.

With this configuration, external light deviating from angles of view of the first and second imaging modules toward the first imaging module in the direction along the short side can be prevented from entering the first and second lens portions.

The imaging apparatus may be configured as a vehicle-mounted camera.

The imaging apparatus may be configured as a front sensing camera.

MODE(S) FOR CARRYING OUT THE INVENTION

[Schematic Configuration of Imaging Apparatus 1]

Hereinafter, an imaging apparatus 1 according to an embodiment of the present technology will be described in detail with reference to the drawings. Each of the figures shows common, mutually orthogonal X-axis, Y-axis, and Z-axis. The X-axis, Y-axis, and Z-axis are common in all the figures. In the attitude of the imaging apparatus 1 shown in each figure, the XY-plane extends horizontally and the Z-axis extends vertically.

Figure 1:
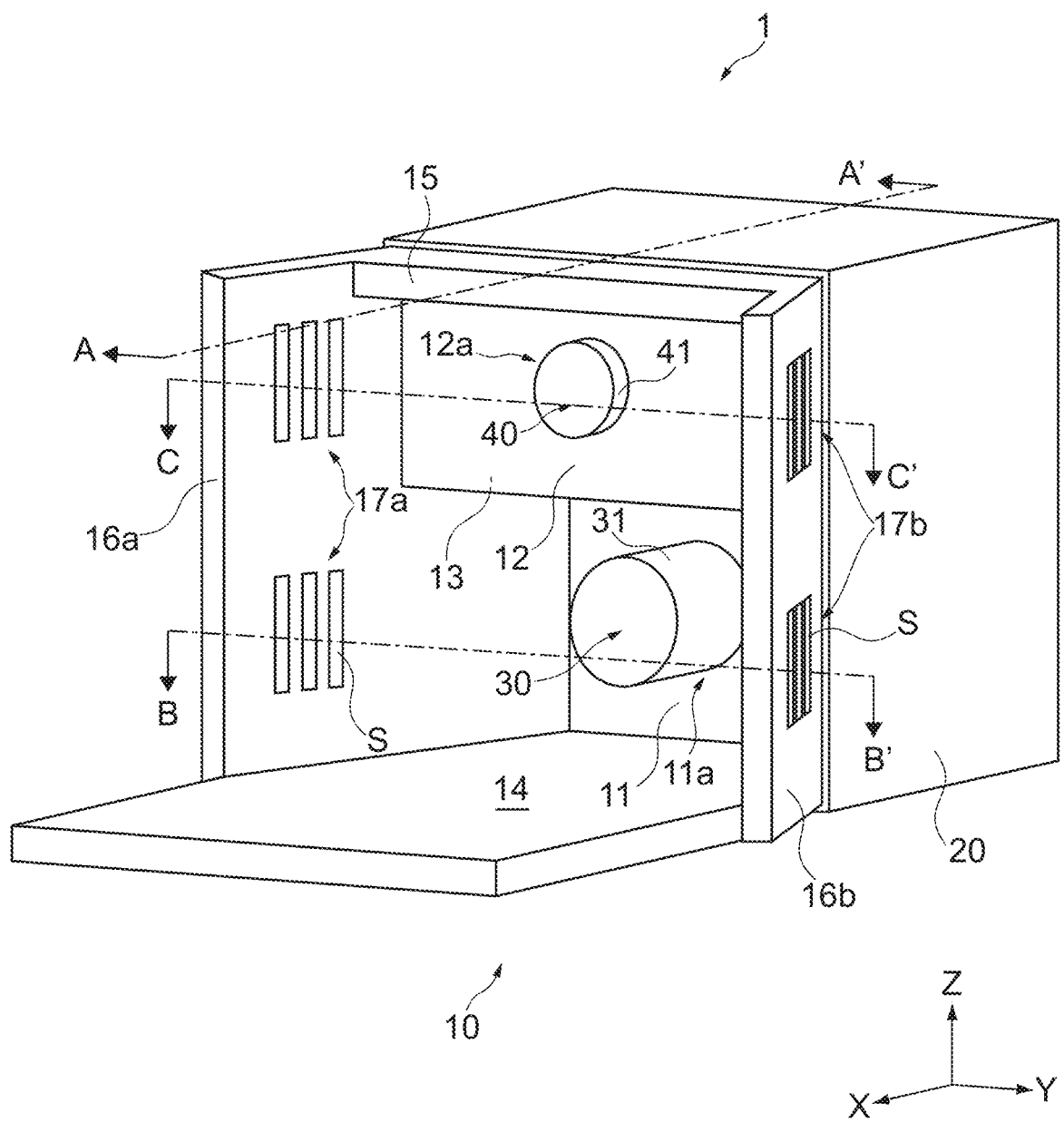
FIG. 1 A cross-sectional view of an imaging apparatus according to an embodiment of the present technology.
Figure 2:
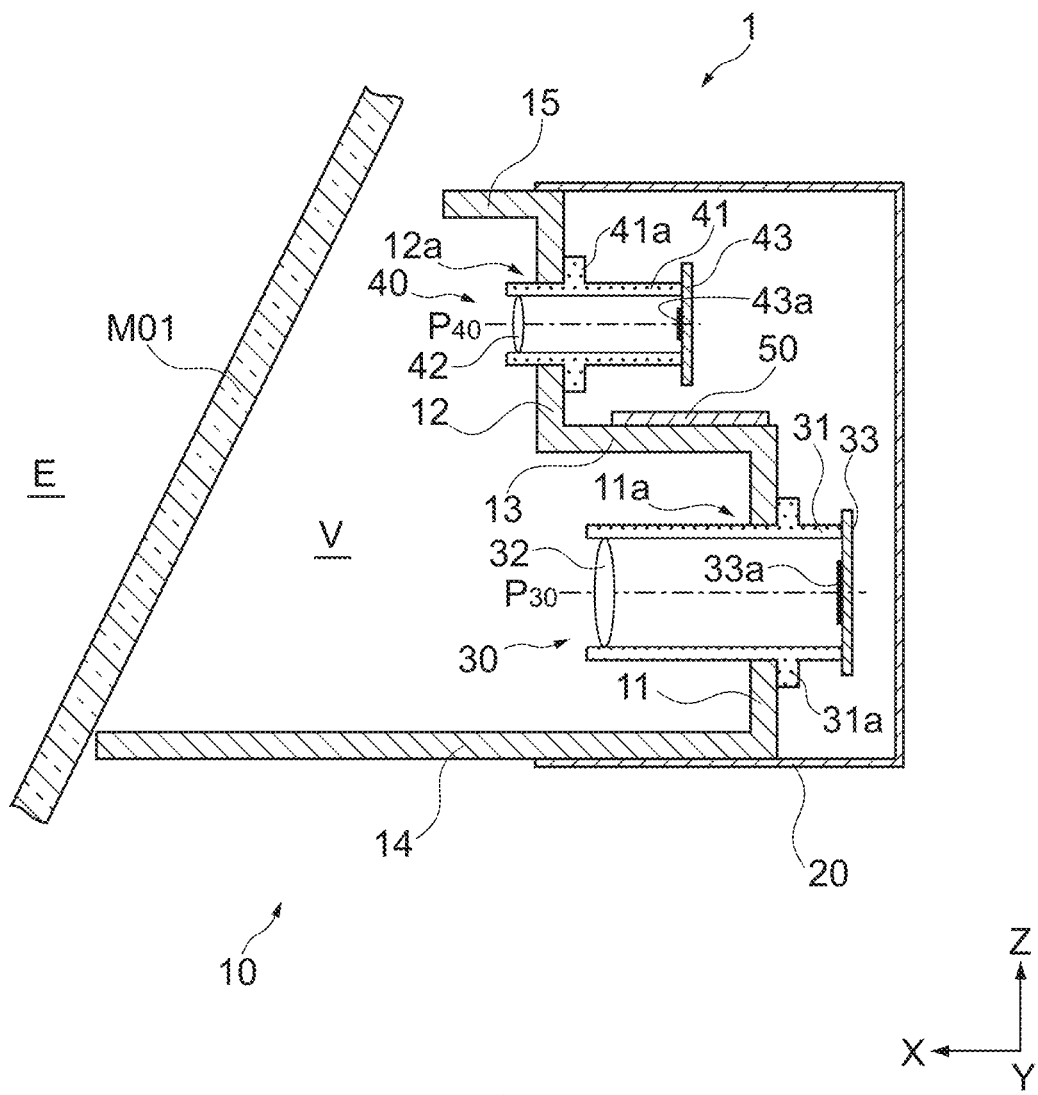
FIG. 2 A cross-sectional view of the imaging apparatus taken along the line A-A' of FIG. 1.
Figure 3:
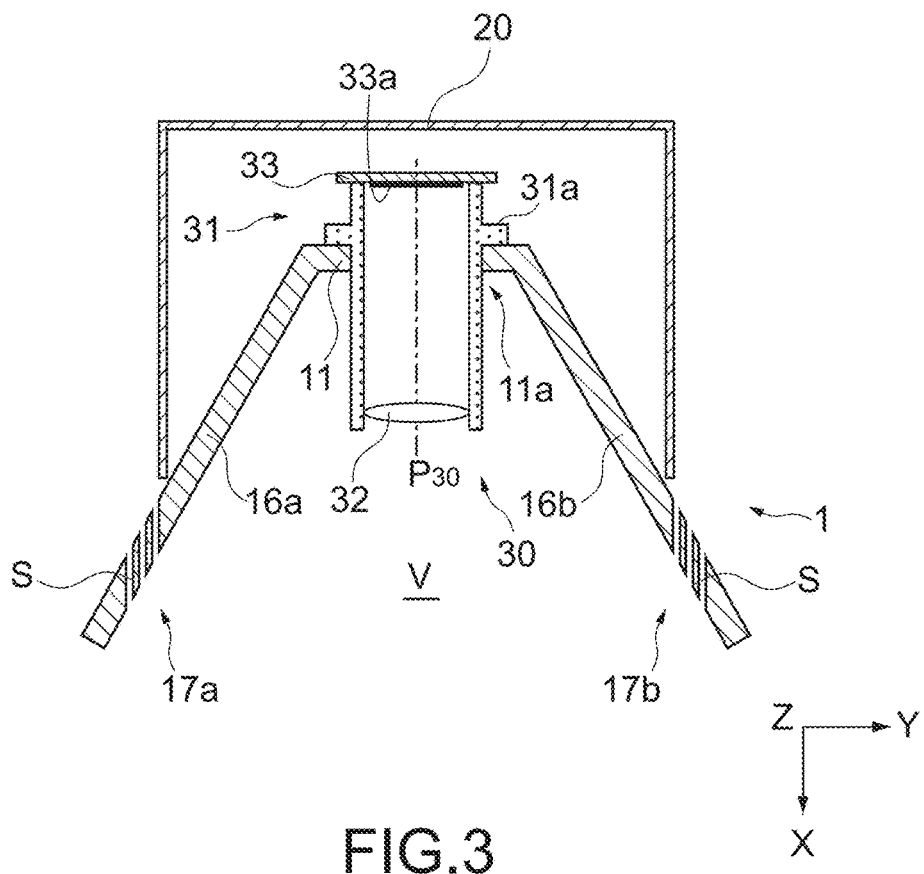
FIG. 3 A cross-sectional view of the imaging apparatus taken along the line B-B' of FIG. 1.
Figure 4:
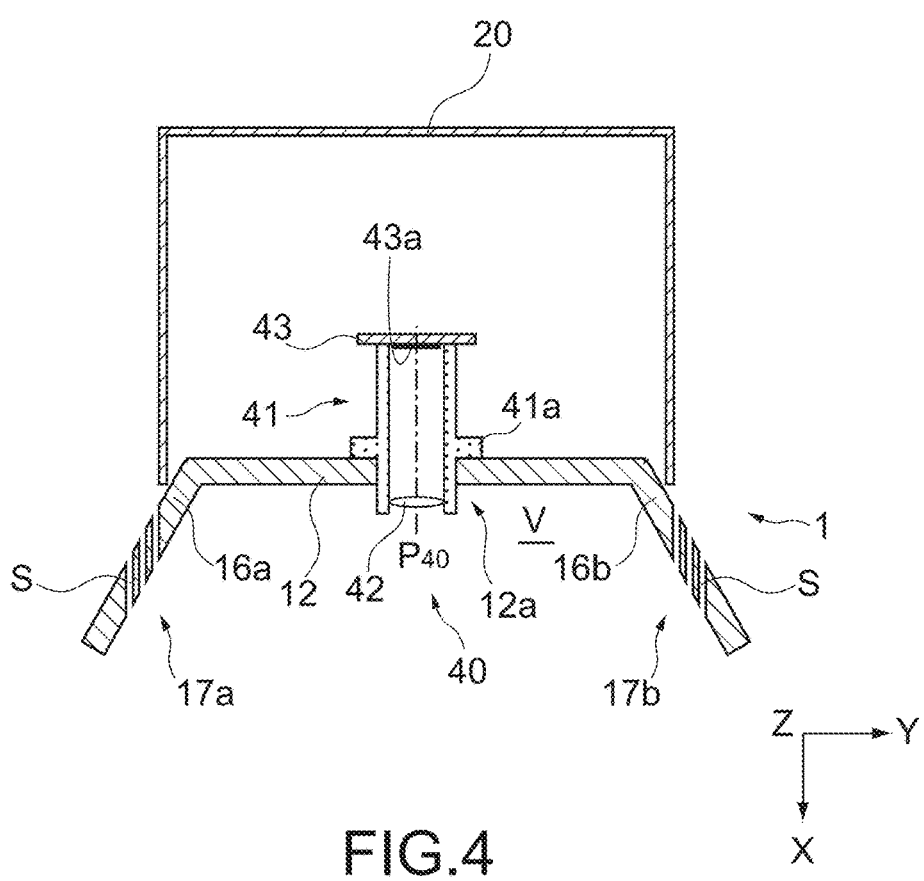
FIG. 4 A cross-sectional view of the imaging apparatus taken along the line C-C' of FIG. 1.

FIG. 1 is a perspective view of the imaging apparatus 1 according to this embodiment. FIGS. 2 to 4 are cross-sectional views of the imaging apparatus 1. Specifically, FIG. 2 shows a cross-section of the imaging apparatus 1 taken along the line A-A' of FIG. 1. FIG. 3 shows a cross-section of the imaging apparatus 1 taken along the line B-B' of FIG. 1. FIG. 4 shows a cross-section of the imaging apparatus 1 taken along the line C-C' of FIG. 1.

The imaging apparatus 1 is a vehicle-mounted camera that can be mounted on an automobile, and more particularly, configured as a front sensing camera for generating an image that can be used for self-driving, driving assistance, or the like. The imaging apparatus 1 sets the imaging direction in front in the X-axis direction, i.e., is configured to be capable of imaging an external environment E extending in front in the X-axis direction.

The imaging apparatus 1 is typically installed forward inside a windshield M01 of the automobile as shown in FIG. 2. Accordingly, the imaging apparatus 1 is capable of imaging the external environment E extending in front through the windshield M01. The imaging apparatus 1 includes a first imaging module 30 and a second imaging module 40 for imaging the external environment E.

The first imaging module 30 has an optical axis $P_{30}$ extending parallel to the X-axis and includes a first cylindrical portion 31, a first lens portion 32, and a first imaging element substrate 33. The first cylindrical portion 31 is a cylindrical member extending along the optical axis $P_{30}$. The first cylindrical portion 31 includes the first lens portion 32 at the front end and the imaging element substrate 33 at the rear end.

The first imaging element substrate 33 extends along the YZ plane and includes a first imaging element 33a provided on the main surface facing forward. The first imaging element substrate 33 is disposed such that the first imaging element 33a can be housed in the first cylindrical portion 31. The first imaging module 30 is configured such that light transmitted through the first lens portion 32 forms an image in the first imaging element 33a.

The second imaging module 40 has an optical axis $P_{40}$ extending parallel to the X-axis at a position where it overlaps the optical axis $P_{30}$ above the optical axis $P_{30}$, and includes a second cylindrical portion 41, a second lens portion 42, and a second imaging element substrate 43. The second cylindrical portion 41 is a cylindrical member extending along the optical axis $P_{40}$. The second cylindrical portion 41 includes the second lens portion 42 at the front end and the second imaging element substrate 43 at the rear end.

The second imaging element substrate 43 extends along the YZ plane and includes a second imaging element 43a provided on the main surface facing forward. The second imaging element substrate 43 is disposed such that the second imaging element 43a can be housed in the second cylindrical portion 41. The second imaging module 40 is configured such that light transmitted through the second lens portion 42 forms an image in the second imaging element 43a.

In the imaging apparatus 1, the imaging elements 33a and 43a provided on the imaging element substrates 33 and 43 are not limited to a specific type. In the imaging apparatus 1, charge coupled devices (CCD), complementary metal oxide semiconductors (CMOS), or the like, for example, can be used as the imaging elements 33a and 43a.

It should be noted that the configuration of the imaging apparatus 1 according to the present technology is particularly suitable in a case where the imaging elements 33a and 43a have a size (1/1.7 type) of 4.32 mm in length and 8.64 mm in width, the number of pixels is several mega-pixels or more (particularly, 7 mega-pixels or more), and the allowable range of the focal position shift of the lens portions 32 and 42 is several μm or less (e.g., ±3 μm). Moreover, the configuration of the imaging apparatus 1 according to the present technology is also particularly suitable in a case where the imaging elements 33a and 43a are of 1/1.7 type, the pixel density is higher than the configuration of 7 mega-pixels as to the number of pixels, and the allowable range of the focal position shift of the lens portions 32 and 42 is several μm or less (e.g., ±3 μm).

Additionally, various components other than the imaging elements 33a and 43a may be mounted on the imaging element substrates 33 and 43. For example, image processing units or the like for performing image processing on images captured by the imaging modules 30 and 40 such that they can be used for self-driving or driving assistance can be mounted on the imaging element substrates 33 and 43.

In the imaging apparatus 1, the first lens portion 32 of the first imaging module 30 and the second lens portion 42 of the second imaging module 40 have fixed focal points with focal lengths different from each other. Specifically, the focal length of the first lens portion 32 is longer than the focal length of the second lens portion 42. That is, the angle of view of the first imaging module 30 is smaller than the angle of view of the second imaging module 40.

The imaging apparatus 1 is capable of generating an image of a distant region in the external environment E through the first imaging module 30 and is capable of generating an image of a region near the automobile in the external environment E through the second imaging module 40. Accordingly, the imaging apparatus 1 can simultaneously acquire detailed information of the distant and near areas in the external environment E.

It should be noted that the lens portions 32 and 42 of the imaging modules 30 and 40 are not limited to the single-lens configuration as shown in FIGS. 2 to 4 and may have a configuration in which a plurality of lenses is combined. Additionally, the imaging modules 30 and 40 may each have configurations other than that described above as necessary, and may include other optical members such as a reflection mirror and a prism, for example.

Figure 5:
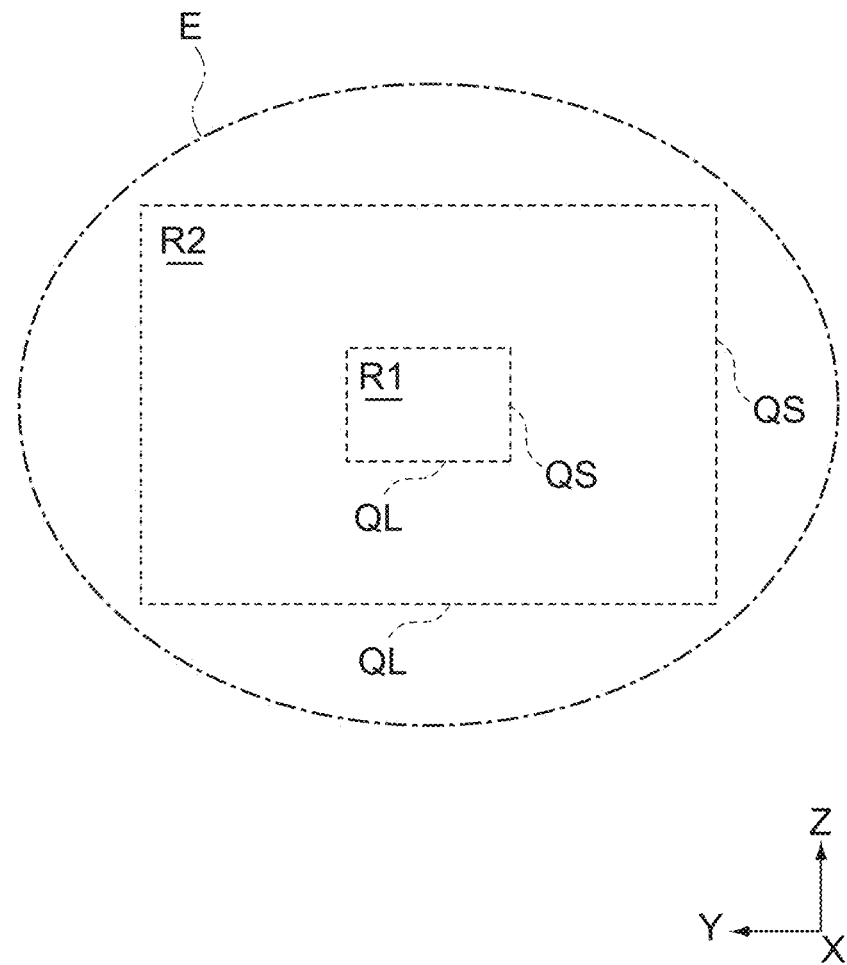
FIG. 5 A diagram showing imaging regions of the imaging apparatus.

In FIG. 5, a first imaging region R1 that can be imaged by the first imaging module 30 and a second imaging region R2 that can be imaged by the second imaging module 40 are shown by the broken lines as regions that can be imaged by the imaging apparatus 1 in the external environment E. Moreover, in FIG. 5, the external environment E is schematically shown by the dash-dot line as an oval region.

The imaging regions R1 and R2 of the imaging modules 30 and 40 both have a rectangular shape having a short side QS extending in an upper-lower direction along the Z-axis and a long side QL extending in a left-right direction along the Y-axis. The short side QS and the long side QL of the first imaging region R1 of the first imaging module 30 are both smaller than the short side QS and the long side QL of the second imaging region R2 of the second imaging module 40.

In the imaging apparatus 1, as shown in FIGS. 1 and 2, the imaging modules 30 and 40 are arranged side by side in the upper-lower direction, i.e., in a direction along the short sides QS of the imaging regions R1 and R2. Accordingly, since the angle of view in the direction along the short side QS is reduced in both the imaging modules 30 and 40, the angle of view is less likely to be blocked from each other.

That is, in the imaging apparatus 1, vignetting is less likely to occur even when the distance between the imaging modules 30 and 40 in the upper-lower direction is reduced. Therefore, in the imaging apparatus 1, downsizing by reducing the distance between the imaging modules 30 and 40 is possible. Accordingly, in the imaging apparatus 1, it is possible to ensure a wide field of view in front of a driver.

[Detailed Configuration of Imaging Apparatus 1]

The imaging apparatus 1 further includes a frame portion 10 and a casing portion 20. The frame portion 10 is configured as a holding member for holding the casing portion 20 and the imaging modules 30 and 40. The frame portion 10 can be formed by, for example, an injection molding method using a resin material, a sheet metal processing method using a metal material, or the like.

The casing portion 20 is configured as a rectangular parallelepiped-shaped hollow member and its interior is opened forward. The casing portion 20 covers the frame portion 10 from the rear in a state of housing rear approximately half of the frame portion 10. Accordingly, a closed space closed by the frame portion 10 is formed inside the casing portion 20.

The frame portion 10 includes a first holding portion 11, a second holding portion 12, and a connecting portion 13. The housing portions 11 and 12 have a flat plate shape extending along the YZ plane. The connecting portion 13 has a flat plate shape extending along the XY plane. The holding portions 11 and 12 and the connecting portion 13 of the frame portion 10 are all put in the casing portion 20.

The second holding portion 12 of the frame portion 10 is disposed at a position above the first holding portion 11, the second holding portion 12 being offset forward from the first holding portion 11. The connecting portion 13 connects an upper end portion of the first holding portion 11 located below and a lower end portion of the second holding portion 12 located above it to each other in a front-back direction and forms a step in the front-back direction between the holding portions 11 and 12.

The first holding portion 11 has a first opening 11a penetrating in the front-back direction. Moreover, the second holding portion 12 has a second opening 12a penetrating in the X-axis direction. The openings 11a and 12a are located in center portions of the holding portions 11 and 12 in the upper-lower, left-right directions and are configured as insertion holes of the imaging modules 30 and 40.

The imaging modules 30 and 40 are inserted into the openings 11a and 12a to the front from the rear of the holding portions 11 and 12. The imaging modules 30 and 40 are provided with flange portions 31a and 41a protruding along the outer peripheral surfaces of the cylindrical portions 31 and 41 and the cylindrical portions 31 and 41 are fixed to the holding portions 11 and 12 in the flange portions 31a and 41a.

Accordingly, the cylindrical portions 31 and 41 of the imaging modules 30 and 40 are held by the holding portions 11 and 12 in a state in which the cylindrical portions 31 and 41 protrude forward and rearward. In the imaging modules 30 and 40, the lens portions 32 and 42 are positioned more forward than the holding portions 11 and 12 and the imaging element substrates 33 and 43 are positioned more rearward than the holding portions 11 and 12.

The first lens portion 32 of the first imaging module 30 is positioned more rearward than the second holding portion 12 and is shielded by the connecting portion 13 from above. Accordingly, in the first imaging module 30, external light deviated upward from the angle of view is less likely to enter the first lens portion 32 by being blocked by the connecting portion 13.

It should be noted that it is favorable that in the frame portion 10, at least the holding portions 11 and 12 and the connecting portion 13 be integrally formed, i.e., configured as a single integral piece. Accordingly, in the imaging apparatus 1, the position shift of the imaging modules 30 and 40 is less likely to occur because the imaging modules 30 and 40 are positioned by the frame portion 10 at once.

Moreover, the frame portion 10 further includes a first shade portion 14 and a second shade portion 15 for shielding, in the upper-lower direction, a space V in front of the imaging modules 30 and 40. The first shade portion 14 extends forward from the lower end portion of the first holding portion 11 and the second shade portion 15 extends forward from the upper end portion of the second holding portion 12.

The first shade portion 14 extends forward by a large amount and typically extends forward to the inner surface of the windshield M01 as shown in FIG. 2. Accordingly, the imaging apparatus 1 can prevent external light, such as reflected light from below the angles of view of the imaging modules 30 and 40, from entering the lens portions 32 and 42.

Moreover, the imaging apparatus 1 can prevent the occurrence of vignetting caused by the first shade portion 14 by placing the first imaging module 30 having the first lens portion 32 having a smaller angle of view on the lower side. Moreover, since both the imaging modules 30 and 40 have a smaller angle of view in the upper-lower direction, the first shade portion 14 can be placed in proximity thereto.

The second shade portion 15 extends forward by a small amount. Accordingly, the imaging apparatus 1 can prevent the occurrence of vignetting caused by the second shade portion 15 in the second imaging module 40 having the second lens portion 42 having a larger angle of view. The extension amount of the second shade portion 15 can be determined as appropriate within a range that does not block the angle of view of the second imaging module 40.

In addition, the frame portion 10 further includes a pair of hood portions 16a and 16b for shielding respectively the space V in front of the imaging modules 30 and 40 in the left-right direction. The hood portions 16a and 16b connect the shade portions 14 and 15 in the upper-lower direction and extend in a tapered shape having a width in the left-right direction that is increased forward from the holding portions 11 and 12.

The hood portions 16a and 16b can prevent external light deviating from the angles of view of the imaging modules 30 and 40 in the left-right direction from entering the lens portions 32 and 42. Moreover, the hood portions 16a and 16b are unlikely to block the angles of view of the imaging modules 30 and 40 because the hood portions 16a and 16b have a tapered shape having a width in the left-right direction that is increased forward.

Moreover, the hood portions 16a and 16b have through-hole portions 17a and 17b for connecting the space V in front of the imaging modules 30 and 40 to the outside. The through-hole portions 17a and 17b are each constituted by a plurality of slits S extending in the upper-lower direction. The respective slits S of the through-hole portions 17a and 17b penetrate the hood portions 16a and 16b in the X-axis direction.

The imaging apparatus 1 can suppress air stagnation in the space V because the through-hole portions 17a and 17b ensure ventilation of the space V between the hood portions 16a and 16b. Accordingly, the imaging apparatus 1 can prevent fogging of the lens portions 32 and 42 in the imaging modules 30 and 40.

Moreover, in the hood portions 16a and 16b, light passing through the through-hole portions 17a and 17b is unlikely to be spread in the space V because the through-hole portions 17a and 17b are constituted by the slits S. Moreover, in the hood portions 16a and 16b, light passing from the rear to the front through the slits S is less likely to enter the imaging modules 30 and 40 because the slits S penetrate the hood portions 16a and 16b in the front-back direction.

It should be noted that in the imaging apparatus 1, it is sufficient that the hood portions 16a and 16b are configured such that external light passing through the through-hole portions 17a and 17b does not enter the lens portions 32 and 42 of the imaging modules 30 and 40. That is, the through-hole portions 17a and 17b do not need to include the plurality of slits S and, for example, may be constituted by a single slit S or may be constituted by a plurality of round holes.

The imaging apparatus 1 further includes a circuit board 50. The circuit board 50 can be disposed on the connecting portion 13, for example. Various components for realizing the functions necessary for the imaging apparatus 1 can be mounted on the circuit board 50. For example, an in-vehicle communication unit or the like for transmitting an image captured by the imaging modules 30 and 40 can be mounted on the circuit board 50.

[Drive Control System 100]

BRIEF DESCRIPTION

Figure 7:
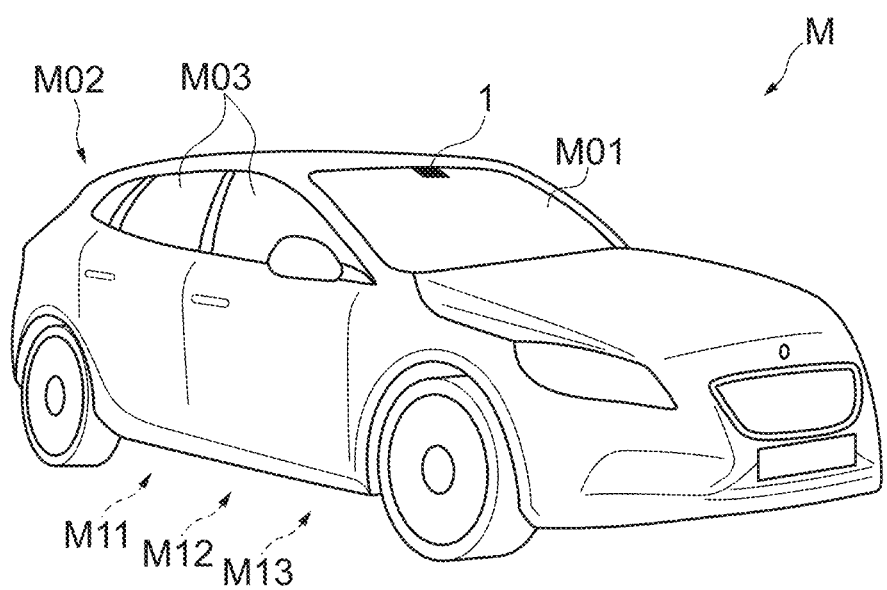
FIG. 7 A perspective view of an automobile on which the imaging apparatus is mounted.

FIG. 7 is a perspective view of an automobile M on which the imaging apparatus 1 according to this embodiment is mounted. The automobile M includes, as transparent glass windows, a windshield (front window) M01 disposed on the front side, a rear window M02 disposed on the rear side, and side windows M03 disposed on the opposite lateral sides.

The imaging apparatus 1 shown in FIG. 7 is configured as a front sensing camera mounted inside the windshield M01. The imaging apparatus 1 is disposed on an upper part of a widthwise central region of the windshield M01. Accordingly, the imaging apparatus 1 can favorably capture an image of the scenery in front of the automobile M without obstructing the driver's view.

The automobile M on which the imaging apparatus 1 is mounted includes a driving force generating mechanism M11 including an engine, a motor, and the like, a braking mechanism M12, a steering mechanism M13, and the like inside the automobile M in order to realize the driving function. Additionally, the automobile M may include, for example, a surrounding information detecting unit for detecting surrounding information, a positioning unit for generating position information, and the like.

A drive control system 100 according to an embodiment of the present technology is a system for controlling the driving of the automobile M by using the above-mentioned imaging apparatus 1. Specifically, the drive control system 100 controls the driving force generating mechanism M11, the braking mechanism M12, the steering mechanism M13, and the like of the automobile M by using an image captured by the imaging apparatus 1. An image captured by the imaging apparatus 1 is sent to the drive control system 100 as high-quality image data (raw image data) not compressed and encoded.

The drive control system 100 may have a configuration that provides functions necessary for the automobile M. Specific examples of the functions that can be realized by the drive control system 100 can include a driving assistance function, a self-driving function, and the like. Hereinafter, configurations of the drive control system 100 that can realize the driving assistance function and the self-driving function will be described.

(Driving Assistance Function)

The driving assistance function is typically an advanced driver assistance system (ADAS) function including collision avoidance, impact mitigation, cruise control (maintaining a vehicle-to-vehicle distance), speed control, collision warning, lane departure warning, and the like. The drive control system 100 can be configured such that these driving assistance functions can be realized.

Figure 8:
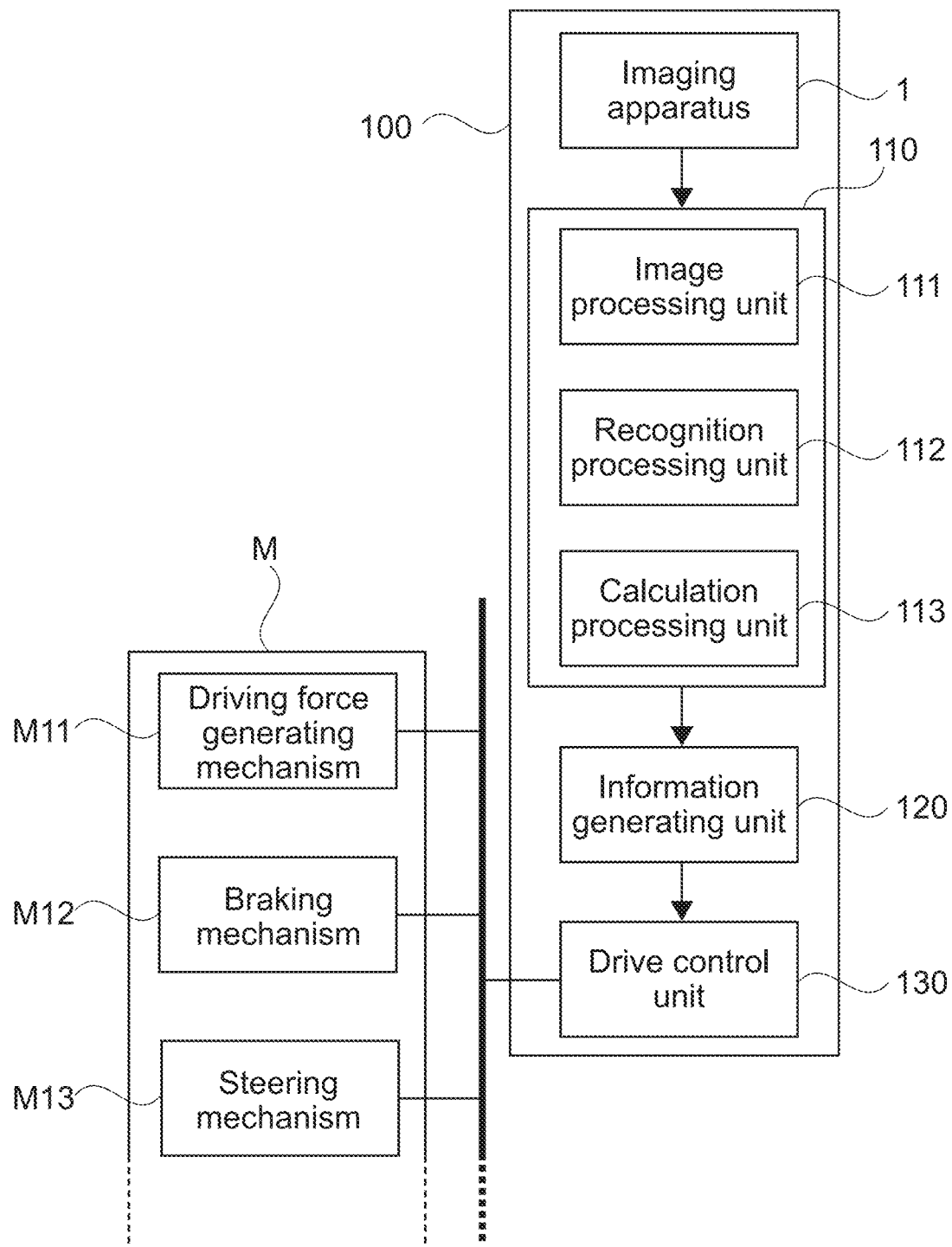
FIG. 8 A block diagram showing configurations capable of realizing a driving assistance function in a drive control system according to the embodiment of the present technology.

FIG. 8 is a block diagram showing configurations of the drive control system 100 that can realize the driving assistance function. The drive control system 100 includes an imaging apparatus 1, a processing unit 110, an information generating unit 120, and a drive control unit 130. The processing unit 110 includes an image processing unit 111, a recognition processing unit 112, and a calculation processing unit 113.

The respective configurations of the drive control system 100 are connected to each other via a communication network. The communication network may be, for example, a vehicle-mounted communication network that conforms to any standard such as a controller area network (CAN), a local interconnect network (LIN), a local area network (LAN), and FlexRay (registered trademark).

Figure 9:
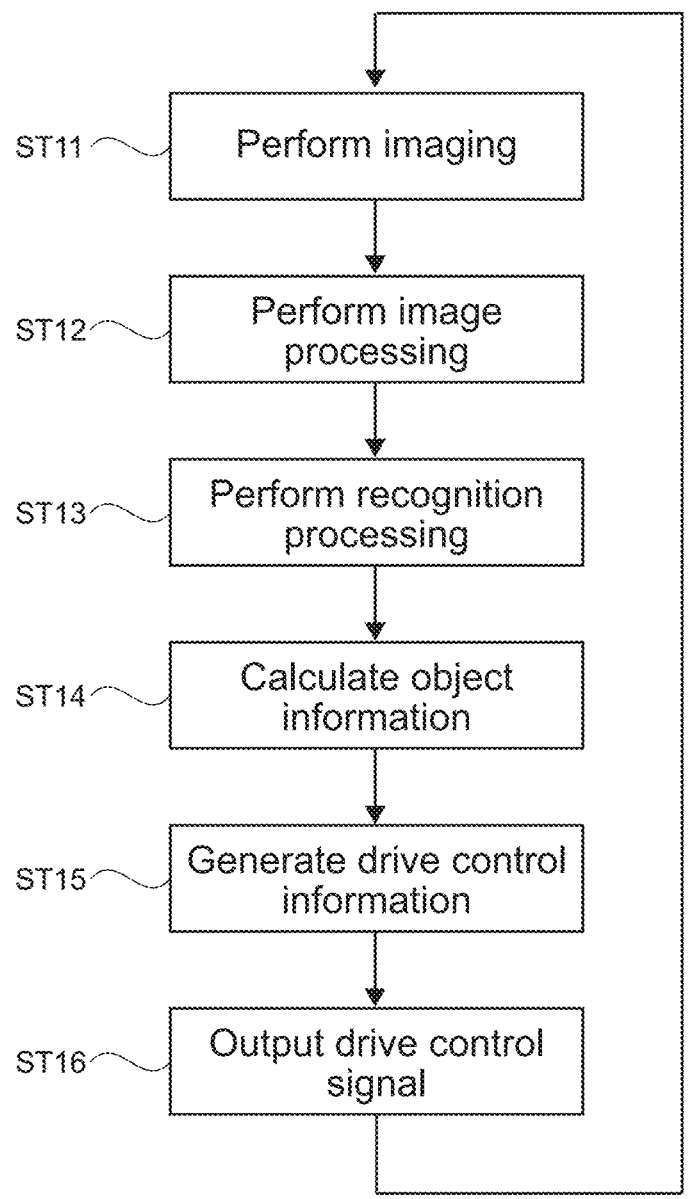
FIG. 9 A flowchart showing a drive control method in the drive control system.

FIG. 9 is a flowchart showing a drive control method by the drive control system 100 shown in FIG. 8. The drive control method shown in FIG. 9 includes an imaging step ST11, an image processing step ST12, a recognition processing step ST13, an object information calculation step ST14, a drive control information generating step ST15, and a drive control signal output step ST16.

In the imaging step ST11, the imaging apparatus 1 generates a raw image by imaging the scenery in front of the automobile M through the windshield M01. The imaging apparatus 1, for example, transmits the raw image to the processing unit 110 through the in-vehicle communication unit mounted on the circuit board 50.

The processing unit 110 is typically configured as an electronic control unit (ECU) and processes the raw image generated by the imaging apparatus 1. More specifically, in the processing unit 110, the image processing unit 111 performs the image processing step ST12, the recognition processing unit 112 performs the recognition processing step ST13, and the calculation processing unit 113 performs the object information calculation step ST14.

In the image processing step ST12, the image processing unit 111 performs image processing on the raw image to generate a processed image. The image processing by the image processing unit 111 is typically processing for making it easy to recognize an object in the raw image, and is, for example, automatic exposure control, automatic white balance adjustment, high-dynamic-range rendering, or the like.

It should be noted that in the image processing step ST12, at least some processes of the image processing may be performed by the image processing unit mounted on the circuit board 50 of the imaging apparatus 1. It should be noted that in a case where all processes of the image processing in the image processing step ST12 are performed by the image processing unit of the imaging apparatus 1, the processing unit 110 does not need to include the image processing unit 111.

In the recognition processing step ST13, the recognition processing unit 112 performs recognition processing on the processed image to recognize an object in the processed image. It should be noted that the object recognized by the recognition processing unit 112 is not limited to a three-dimensional object, and, for example, includes a vehicle, a pedestrian, an obstacle, a traffic light, a traffic sign, a road lane, and a sidewalk curb.

In the object information calculation step ST14, the calculation processing unit 113 calculates object information related to the object in the processed image. Examples of the object information calculated by the calculation processing unit 113 can include a shape of the object, a distance to the object, movement direction and movement speed of the object, and the like. The calculation processing unit 113 uses a plurality of temporally consecutive processed images to calculate dynamic object information.

Figure 10:
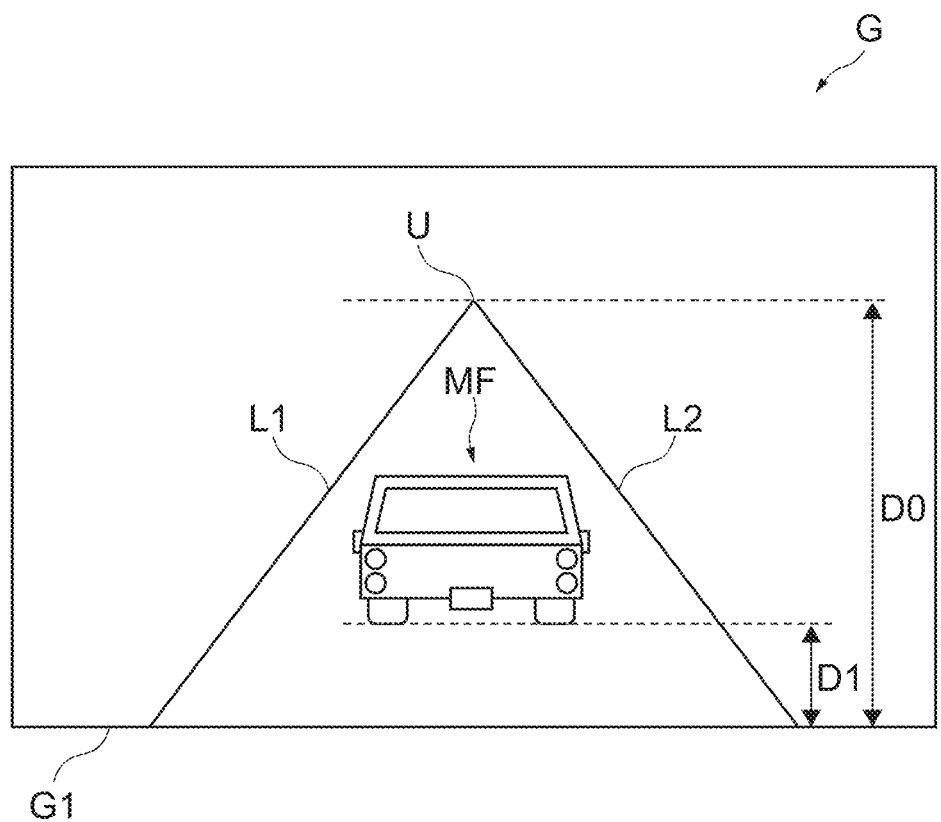
FIG. 10 A diagram for describing an example of a method of calculating a vehicle-to-vehicle distance with respect to a preceding vehicle by a calculation processing unit of the drive control system.

A method of calculating a vehicle-to-vehicle distance with respect to a preceding vehicle MF will be described as an example of a method of calculating the object information by the calculation processing unit 113. FIG. 10 shows an example of a processed image G generated by the image processing unit 111. The processed image G shown in FIG. 10 shows the preceding vehicle MF and two lane lines L1 and L2 that define a driving lane.

A vanishing point U at which the two lane lines L1 and L2 intersect in the processed image G is first determined. It should be noted that the vanishing point U may be determined on the basis of other objects, not the lane lines L1 and L2. For example, the calculation processing unit 113 may determine the vanishing point U by using a sidewalk curb, a movement trajectory of a fixed object such as a traffic sign in the plurality of processed images, and the like.

Next, a distance D0 from a lower edge portion G1 of the processed image to the vanishing point U (dimension in the upper-lower direction in the image) and a distance D1 from the lower edge portion G1 of the processed image to the preceding vehicle MF (dimension in the upper-lower direction in the image) are determined. The vehicle-to-vehicle distance with respect to the preceding vehicle MF can be determined by using the distances D0 and D1. For example, the use of a ratio of the distance D0 to the distance D1 can calculate the vehicle-to-vehicle distance with respect to the preceding vehicle MF.

As described above, in a case where the distance is calculated on the basis of the pixel position of the object such as the preceding vehicle MF in the image, the detected position of the object is shifted in the image that is not in focus, which may deteriorate the accuracy. In this regard, the imaging apparatus 1 according to the present technology can accurately calculate a distance to the object owing to the configuration in which the allowable range of the focal position shift of the lens portions 32 and 42 is small.

The processing unit 110 transmits, to the information generating unit 120, data including the processed image and the object information that are obtained in Steps ST12 to ST14. It should be noted that the processing unit 110 is not limited to the configuration described above, and, for example, the processing unit 110 may include a configuration other than the image processing unit 111, the recognition processing unit 112, and the calculation processing unit 113.

In the drive control information generating step ST15, the information generating unit 120 generates drive control information including driving contents necessary for the automobile M. More specifically, on the basis of the data transmitted by the processing unit 110, the information generating unit 120 determines driving contents to be performed by the automobile M, and generates drive control information including the driving contents.

Examples of the driving contents of the automobile M can include a change in speed (acceleration and deceleration), a change in traveling direction, and the like. As specific examples, in a case where the vehicle-to-vehicle distance between the automobile M and the preceding vehicle MF is short, the information generating unit 120 determines that the automobile M needs to be decelerated, and in a case where the automobile M is departing from its lane, the information generating unit 120 determines that the traveling direction needs to be changed to move the automobile M toward the lane center.

The information generating unit 120 transmits the drive control information to the drive control unit 130. It should be noted that the information generating unit 120 may generate information other than the drive control information. For example, the information generating unit 120 may detect the brightness of the ambient environment on the basis of the processed image and may generate illumination control information for turn on the headlight of the automobile M when it is dark in the ambient environment.

In the drive control signal output step ST16, the drive control unit 130 outputs a drive control signal on the basis of the drive control information. For example, the drive control unit 130 can accelerate the automobile M through the driving force generating mechanism M11, decelerate the automobile M through the braking mechanism M12, and change the traveling direction of the automobile M through the steering mechanism M13.

(Autonomous Driving Function)

The self-driving function is a function of autonomously driving the automobile M without the driver's operation. Advanced drive control is necessary for realizing the self-driving function as compared to the driving assistance function. The use of the imaging apparatus 1 capable of generating a high-quality raw image enables the drive control system 100 to more accurately perform the advanced drive control that can realize the self-driving function.

Figure 11:
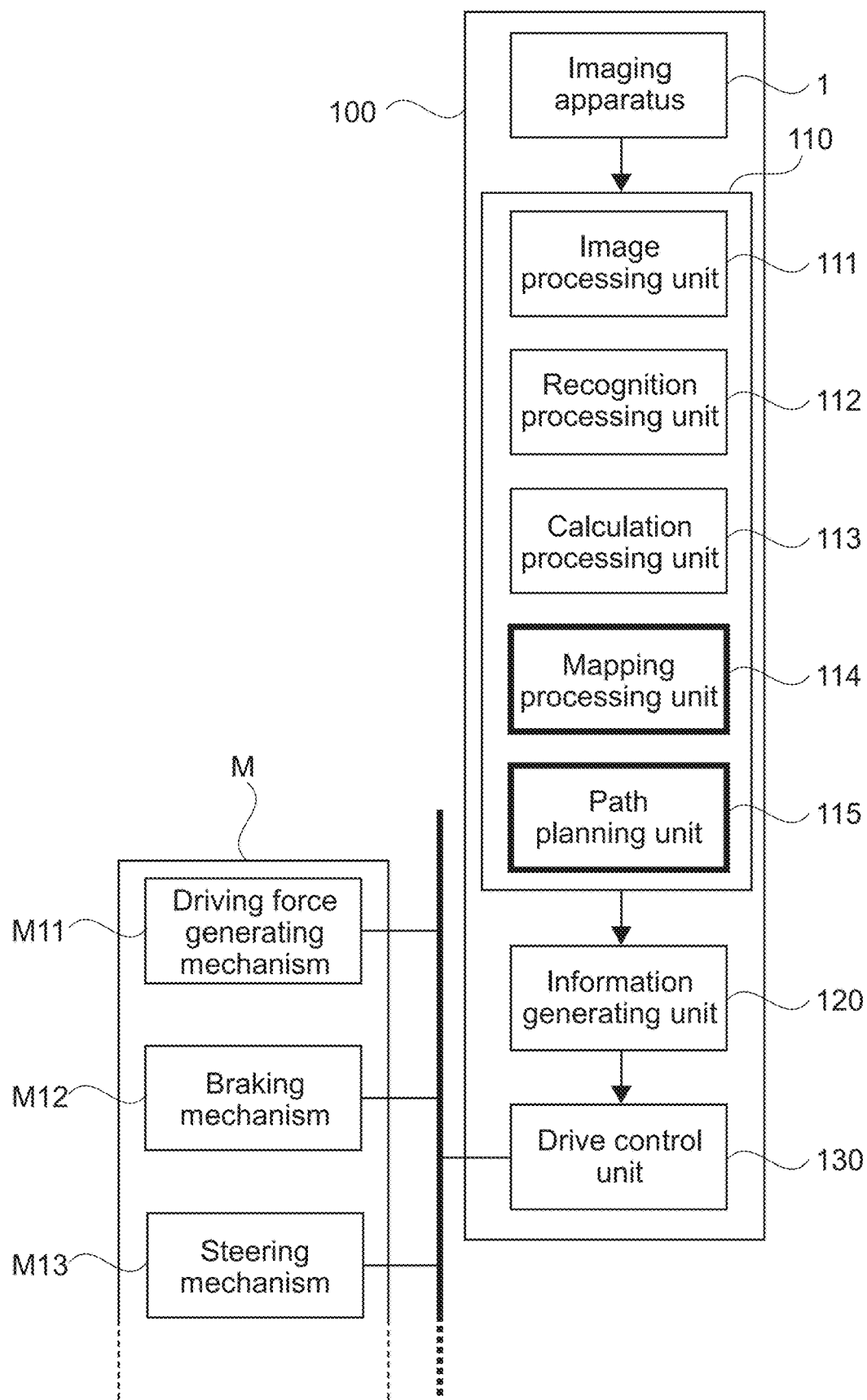
FIG. 11 A block diagram showing configurations capable of realizing a self-driving function in the drive control system.

FIG. 11 is a block diagram showing configurations of the drive control system 100 that can realize the self-driving function. Beside the respective configurations shown in FIG. 8, the drive control system 100 further includes a mapping processing unit 114 and a path planning unit 115 that are included in the processing unit 110. Hereinafter, descriptions of configurations similar to those shown in FIG. 8 will be omitted as appropriate.

Figure 12:
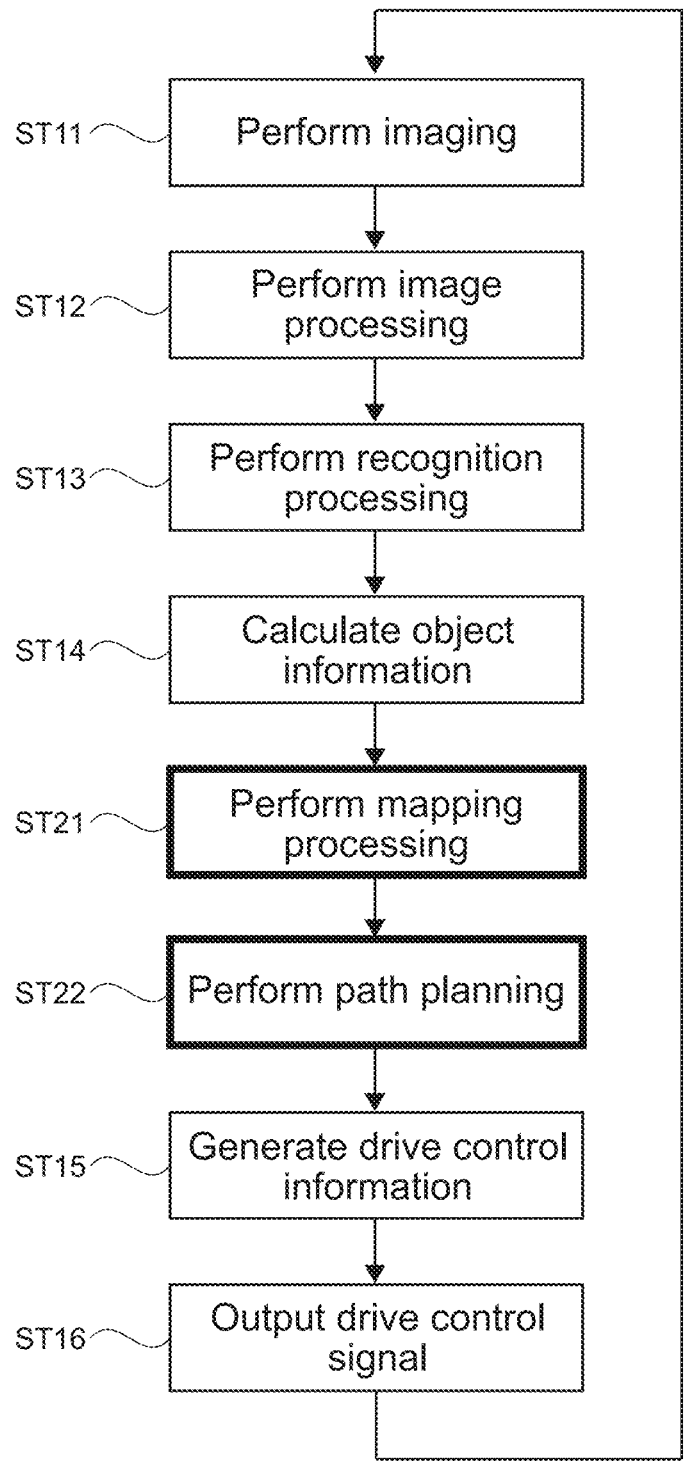
FIG. 12 A flowchart showing a drive control method in the drive control system.

FIG. 12 is a flowchart showing a drive control method by the drive control system 100 shown in FIG. 11. Beside the respective steps shown in FIG. 9, the drive control method shown in FIG. 12 includes the mapping processing step ST21 by the mapping processing unit 114 and the path planning step ST22 by the path planning unit 115.

As shown in FIG. 12, the mapping processing step ST21 and the path planning step ST22 are performed between the object information calculation step ST14 and the drive control information generating step ST15. The path planning step ST22 is performed after the mapping processing step ST21.

In the mapping processing step ST21, the mapping processing unit 114 performs spatial mapping by using the processed image and the object information to thereby generate a digital map. The digital map generated by the mapping processing unit 114 is a three-dimensional map configured by combining static information and dynamic information that are necessary for the self-driving.

The drive control system 100 can generate a high-definition digital map through the mapping processing unit 114 by obtaining a high-quality raw image through the imaging apparatus 1. It should be noted that the mapping processing unit 114 can generate a digital map having a larger information amount by acquiring information other than the raw image obtained through the imaging apparatus 1.

For example, the mapping processing unit 114 is capable of acquiring information from, for example, the surrounding information detecting unit and the positioning unit that are provided in the automobile M. Moreover, the mapping processing unit 114 is capable of acquiring various information by communicating with various devices in the external environment through an external communication unit that enables communication with devices outside the automobile.

The surrounding information detecting unit is configured as, for example, an ultrasonic sensor, a radar device, a light detection and ranging, laser imaging detection and ranging (LIDAR) device, or the like. The mapping processing unit 114 can also acquire, from the surrounding information detecting unit, information regarding the rear, lateral sides, and the like of the automobile M, which is difficult to be obtained from the imaging apparatus 1.

The positioning unit is configured to be capable of receiving, for example, a global navigation satellite system (GNSS) signal from a GNSS satellite (e.g., a global positioning system (GPS) signal from a GPS satellite) and performing positioning. The mapping processing unit 114 is capable of acquiring information regarding the position of the automobile M from the positioning unit.

The external communication unit can be configured to use, for example, global system of mobile communications (GSM) (registered trademark), WiMAX (registered trademark), long term evolution (LTE) (registered trademark), LTE-advanced (LTE-A), a wireless LAN (also referred to as Wi-Fi (registered trademark)), Bluetooth (registered trademark), or the like.

In the path planning step ST22, the path planning unit 115 performs path planning to determine a traveling route of the automobile M by using the digital map. The path planning includes various processing, for example, detection of an empty space on a road, movement prediction of objects such as vehicles and human, and the like.

After the path planning step ST22, the processing unit 110 collectively transmits, to the information generating unit 120, data including the digital map and a result of the path planning that are obtained in Steps ST21 and ST22 in addition to the data including the processed image and the object information that are obtained in Steps ST12 to ST14.

In the drive control information generating step ST15, the information generating unit 120 generates drive control information including driving contents for causing the automobile M to travel along the traveling route in accordance with the path planning determined in the path planning step ST22. The information generating unit 120 transmits the generated drive control information to the drive control unit 130.

In the drive control signal output step ST16, the drive control unit 130 outputs a drive control signal on the basis of the drive control information. That is, the drive control unit 130 controls the driving of the driving force generating mechanism M11, the braking mechanism M12, the steering mechanism M13, and the like such that the automobile M can safely travel along the traveling route in accordance with the path planning.

As described above, in a case where processing such as object position detection, distance calculation, digital-map creation, and path planning is performed, the detected position of the object is shifted in the image that is not in focus, which may deteriorate the accuracy. In this regard, the imaging apparatus 1 according to the present technology can accurately perform such processing owing to the configuration in which the allowable range of the focal position shift of the lens portions 32 and 42 is small.

OTHER EMBODIMENTS

Although the embodiments of the present technology have been described above, it is needless to say that the present technology is not limited only to the above-mentioned embodiment and various modifications can be made without departing from the gist of the present technology.

Figure 6:
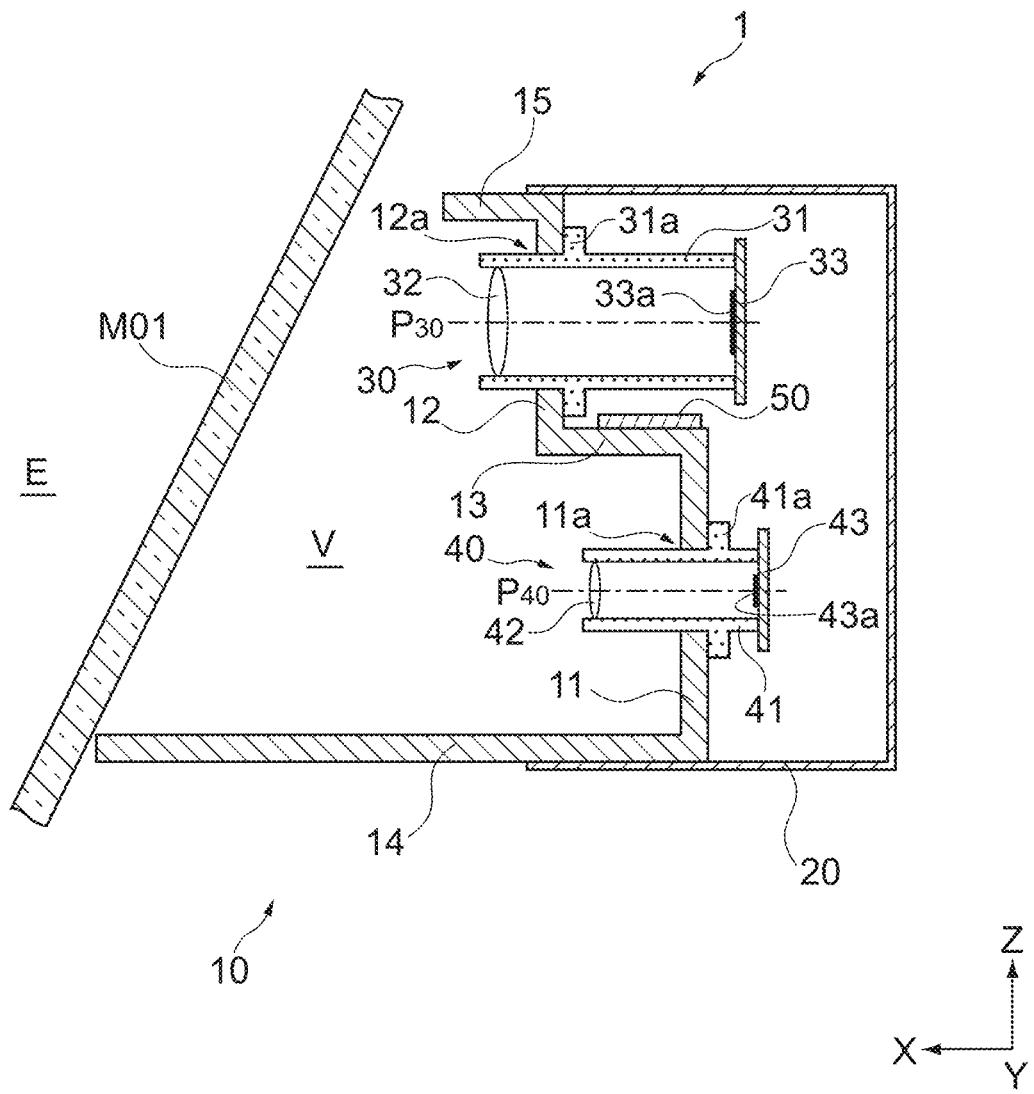
FIG. 6 A cross-sectional view showing another configuration example of the imaging apparatus.

For example, in the imaging apparatus 1, the arrangement of the imaging modules 30 and 40 may be opposite to that of the above embodiment as shown in FIG. 6. That is, in the imaging apparatus 1, the first imaging module 30 including the first lens portion 32 having a longer focal length is provided in the second holding portion 12 and the second imaging module 40 including the second lens portion 42 having a shorter focal length may be provided in the first holding portion 11.

The relative positions of the imaging modules 30 and 40 in the front-back direction can be adjusted as appropriate in a manner that depends on the configuration of the imaging apparatus 1. The relative positions of the imaging modules 30 and 40 in the front-back direction can be adjusted by, for example, the dimensions of the connecting portion 13 in the front-back direction, the positions of the flange portions 31a and 41a along the optical axes $P_{30}$ and $P_{40}$ in the imaging modules 30 and 40, and the like.

Moreover, the configurations of the shade portions 14 and 15 and the hood portions 16a and 16b are not limited to the above configurations, and can be determined as appropriate in accordance with other configurations of the imaging apparatus 1 or the like. For example, the hood portions 16a and 16b do not need to be tapered forward but may extend parallel to each other, and do not need to have the through-hole portions 17a and 17b.

In addition, at least one of the shade portions 14 and 15 and the hood portions 16a and 16b does not need to be configured as the frame portion 10, i.e., may be separate from the holding portions 11 and 12 and the connecting portion 13. Additionally, in the imaging apparatus 1, at least one of the shade portions 14 and 15 and the hood portions 16a and 16b may be omitted as appropriate for the sake of convenience of design and the like.

Moreover, the configuration of the frame portion 10 is not limited to the above configuration, and can be determined as appropriate in accordance with other configurations of the imaging apparatus 1 or the like. For example, the configuration of the connecting portion 13 that forms the step in the front-back direction between the holding portions 11 and 12 can be modified as appropriate, and also the connecting portion 13 may be omitted as a configuration that does not form the step in the front-back direction.

In addition, at least one of the optical axes $P_{30}$ and $P_{40}$ of the imaging modules 30 and 40 may be inclined in the upper-lower, left-right directions with respect to the X-axis within a range that can image the front external environment E. Alternatively, in the imaging modules 30 and 40, the short side QS and long side QL of the imaging regions R1 and R2 within the front external environment E may be inclined with respect to the Z-axis and Y-axis.

Moreover, the imaging apparatus 1 is not limited to the automobile, and can be applied to various movable objects. Examples of the movable objects to which the imaging apparatus 1 can be applied include automobiles, electric vehicles, hybrid electric vehicles, motorcycles, bicycles, personal transporters, airplanes, drones, ships, robots, construction machinery, agricultural machinery (tractors), and the like.

Additionally, the imaging apparatus 1 is not limited to the front sensing camera, and, for example, can be configured as another vehicle-mounted camera such as a front view camera, a rear sensing camera, a rear view camera. In addition, the imaging apparatus 1 is not limited to the vehicle-mounted camera, and can be widely used in applications for imaging the two imaging regions R1 and R2 at the same time.

Additionally, the imaging apparatus 1 may include configurations other than the above configurations, as necessary. For example, the imaging apparatus 1 may have three or more imaging modules, i.e., may have imaging modules other than the imaging modules 30 and 40. In addition, the imaging apparatus 1 may be configured integrally combined with an apparatus having another function.

In addition, the configuration in which the imaging apparatus 1 is different from the other configurations (blocks) has been described as the configuration of the drive control system 100 in each of FIGS. 8 and 11. However, any blocks in the drive control system 100 may be included in the imaging apparatus 1. In this case, circuits having the functions of the respective blocks are disposed on the circuit board 50 in the imaging apparatus 1 (or another circuit board electrically connected to the circuit board 50). For example, the image processing unit 111 may be included in the imaging apparatus 1. In this case, a circuit having the function of the image processing unit 111 is disposed on the circuit board 50 in the imaging apparatus 1 (or another circuit board electrically connected to the circuit board 50). Alternatively, the processing unit 110 including a plurality of blocks may be included in the imaging apparatus 1. In this case, the circuits having the functions of the respective blocks included in the processing unit 110 are disposed on the circuit board 50 in the imaging apparatus 1 (or another circuit board electrically connected to the circuit board 50). In addition, the drive control system 100 may be a single apparatus. In this case, circuits having the functions of the respective blocks included in the drive control system 100 are disposed on the circuit board 50 in the imaging apparatus 1 (or another circuit board electrically connected to the circuit board 50).

It should be noted that the present technology can also take the following configurations.

(1) An imaging apparatus, including:
first and second imaging modules that include first and second lens portions having mutually different focal distances and first and second imaging elements that light passing through the first and second lens portions enters, are configured to be capable of imaging first and second imaging regions each having a short side and a long side in an external environment spread in front in an imaging direction, respectively, and are arranged side by side in a direction along the short side; and
a frame portion including first and second holding portions that hold the first and second imaging modules.

(2) The imaging apparatus according to (1), in which
in each of the first and second imaging regions, the short side extends vertically and the long side extends horizontally.

(3) The imaging apparatus according to (2), in which
the second holding portion is located vertically above the first holding portion.

(4) The imaging apparatus according to any one of (1) to (3), in which
the optical axes of the first and second imaging modules overlap in the direction along the short side.

(5) The imaging apparatus according to any one of (1) to (4), in which
the second holding portion is positioned more forward than the first holding portion.

(6) The imaging apparatus according to (5), in which
the second holding portion is positioned more forward than the first lens portion.

(7) The imaging apparatus according to (6), in which
the frame portion further includes a connecting portion that connects the first and second holding portions to each other in a front-back direction.

(8) The imaging apparatus according to (7), in which the first and second holding portions and the connecting portion are integrally formed.

(9) The imaging apparatus according to any one of (5) to (8), in which
the first lens portion has a focal distance longer than a focal distance of the second lens portion.

(10) The imaging apparatus according to any one of (1) to (9), further including
a pair of hood portions that have a through-hole portion formed therein and cover a space in front of the first and second imaging modules on two sides in a direction along the long side, in which
the pair of hood portions are configured to prevent external light passing through the through-hole portion from entering the first and second lens portions.

(11) The imaging apparatus according to (10), in which
the pair of hood portions have a tapered shape having a width in the direction along the long side that is increased forward, and
the through-hole portion penetrates the hood portion in a front-back direction.

(12) The imaging apparatus according to (10) or (11), in which
the through-hole portion is formed in a slit shape extending in the direction along the short side.

(13) The imaging apparatus according to any one of (1) to (12), further including
a shade portion that covers a space in front of the first and second imaging modules from a side of the first imaging module in the direction along the short side.

(14) The imaging apparatus according to any one of (1) to (13), which is configured as a vehicle-mounted camera.

(15) The imaging apparatus according to (14), which is configured as a front sensing camera.

REFERENCE SIGNS LIST 1 imaging apparatus
10 frame portion
11, 12 holding portion
13 connecting portion
14, 15 shade portion
16a, 16b hood portion
17a, 17b through-hole portion
20 casing portion
30, 40 imaging module
31, 41 tubular portion
32, 42 lens portion
33, 43 imaging element substrate
33a, 43a imaging element
50 circuit board
P30, P40 optical axis
R1, R2 imaging region
QS short side
QL long side

The invention claimed is:

1. An imaging apparatus, comprising:
first and second imaging modules that include first and second lens portions having mutually different focal distances and first and second imaging elements that light passing through the first and second lens portions enters, are configured to be capable of imaging first and second imaging regions each having a short side and a long side in an external environment spread in front in an imaging direction, respectively, and are arranged side by side in a direction along the short side wherein the first imaging module has a first optical axis, first imaging element is positioned in a plane that is substantially parallel to the first optical axis, the second imaging module has a second optical axis, and the second imaging element is position in a plane that is substantially parallel to the second optical axis; and
a frame portion including first and second holding portions that hold the first and second imaging modules.

2. The imaging apparatus according to claim 1, wherein
in each of the first and second imaging regions, the short side extends vertically and the long side extends horizontally.

3. The imaging apparatus according to claim 2, wherein
the second holding portion is located vertically above the first holding portion.

4. The imaging apparatus according to claim 1, wherein
the optical axes of the first and second imaging modules overlap in the direction along the short side.

5. The imaging apparatus according to claim 1, wherein
the second holding portion is positioned more forward than the first holding portion.

6. The imaging apparatus according to claim 5, wherein
the second holding portion is positioned more forward than the first lens portion.

7. The imaging apparatus according to claim 6, wherein
the frame portion further includes a connecting portion that connects the first and second holding portions to each other in a front-back direction.

8. The imaging apparatus according to claim 7, wherein
the first and second holding portions and the connecting portion are integrally formed.

9. The imaging apparatus according to claim 5, wherein
the first lens portion has a focal distance longer than a focal distance of the second lens portion.

10. The imaging apparatus according to claim 1, further comprising
a pair of hood portions that have a through-hole portion formed therein and cover a space in front of the first and second imaging modules on two sides in a direction along the long side, wherein
the pair of hood portions are configured to prevent external light passing through the through-hole portion from entering the first and second lens portions.

11. The imaging apparatus according to claim 10, wherein
the pair of hood portions have a tapered shape having a width in the direction along the long side that is increased forward, and
the through-hole portion penetrates the hood portion in a front-back direction.

12. The imaging apparatus according to claim 10, wherein
the through-hole portion is formed in a slit shape extending in the direction along the short side.

13. The imaging apparatus according to claim 1, further comprising
a shade portion that covers a space in front of the first and second imaging modules from a side of the first imaging module in the direction along the short side.

14. The imaging apparatus according to claim 1, which is configured as a vehicle-mounted camera.

15. The imaging apparatus according to claim 14, which is configured as a front sensing camera.

* * * * *